(12) United States Patent
Rollins et al.

(10) Patent No.: US 11,772,845 B2
(45) Date of Patent: Oct. 3, 2023

(54) RACK SECURITY ENCLOSURE BRACKET

(71) Applicant: Nashville Wire Products Manufacturing Company, LLC, Nashville, TN (US)

(72) Inventors: Phillip Kent Rollins, Nashville, TN (US); Randall Louis Berg, Murfreesboro, TN (US)

(73) Assignee: Nashville Wire Products Manufacturing Company, LLC, Nashville, TN (US)

( * ) Notice: Subject to any disclaimer, the term of this patent is extended or adjusted under 35 U.S.C. 154(b) by 189 days.

(21) Appl. No.: 17/551,691

(22) Filed: Dec. 15, 2021

(65) Prior Publication Data

US 2023/0182957 A1    Jun. 15, 2023

(51) Int. Cl.
| | |
|---|---|
| *B65D 19/40* | (2006.01) |
| *B65D 1/40* | (2006.01) |
| *B65G 1/02* | (2006.01) |
| *A47F 5/08* | (2006.01) |
| *A47F 5/10* | (2006.01) |
| *A47B 96/06* | (2006.01) |

(52) U.S. Cl.
CPC .............. *B65D 1/40* (2013.01); *A47B 96/06* (2013.01); *A47F 5/083* (2013.01); *A47F 5/0838* (2013.01); *A47F 5/103* (2013.01); *B65G 1/02* (2013.01); *B65G 2201/0267* (2013.01); *B65G 2207/40* (2013.01)

(58) Field of Classification Search
CPC .. B65D 19/40; B65G 1/02; B65G 2201/0267; B65G 2207/40; A47F 5/103; A47F 5/13; A47F 5/083; A47F 5/0838; A47F 5/0884; A47B 57/406; A47B 96/06
See application file for complete search history.

(56) References Cited

U.S. PATENT DOCUMENTS 3,229,823 A * 1/1966 Hummer ................... A47F 5/13
                                                              211/187
3,486,632 A * 12/1969 Balch ......................... A47F 5/00
                                                              248/221.11
(Continued)

OTHER PUBLICATIONS

Exhibit A is a two page drawing of a prior art system that was offered for sale prior to Dec. 14, 2020. Page 2 of Exhibit A is an enlargement of the drawing of the bracket shown on p. 1.
(Continued)

*Primary Examiner* — Ko H Chan
(74) *Attorney, Agent, or Firm* — Lucian Wayne Beavers; Patterson Intellectual Property Law, PC

(57) ABSTRACT

An adjustable rear mounting bracket may include a planar main body, a channel extending from the planar main body, at least one forward slot, at least one rear slot, a rear pair of tabs, and a forward pair of tabs. The channel is configured to couple to at the rear panel. One of the rear or forward pairs of tabs may be configured to engage a rear leg of the pallet rack for laterally aligning the at least one rear slot or the at least one forward slot with at least one hole of the rear leg. The at least one rear or forward slot may then be vertically adjusted. The at least one rear slot when coupled to the pallet rack may define a close mounting position and, alternatively, the at least one forward slot when coupled to the pallet rack may define an offset mounting position.

20 Claims, 4 Drawing Sheets

(56) References Cited

U.S. PATENT DOCUMENTS

| | | | | |
|---|---|---|---|---|
| 6,016,928 | A | * | 1/2000 | Cothran .................... A47F 5/01 |
| | | | | 211/183 |
| D547,164 | S | * | 7/2007 | Xayoiphonh .................. D8/363 |
| 7,954,656 | B1 | * | 6/2011 | Cuzzocrea .............. F16B 12/42 |
| | | | | 211/189 |
| 10,470,590 | B2 | * | 11/2019 | Wills ....................... A47F 5/103 |
| 10,722,050 | B1 | * | 7/2020 | Stafford ............. A47B 96/1416 |
| 10,750,883 | B2 | * | 8/2020 | Reifert ....................... A47F 5/04 |
| 2008/0179267 | A1 | * | 7/2008 | Johnson ................. A47F 5/101 |
| | | | | 248/207 |
| 2015/0313357 | A1 | * | 11/2015 | David ................. A47B 47/027 |
| | | | | 211/187 |

OTHER PUBLICATIONS

Exhibit B is a Price List that was included with the offer for sale of the system shown in Exhibit A prior to Dec. 14, 2020.

\* cited by examiner

RACK SECURITY ENCLOSURE BRACKET

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to security enclosures and/or safety backstops for pallet racks. More particularly, the present disclosure pertains to adjustable rear mounting brackets for security enclosures and/or safety backstops for pallet racks.

2. Description of the Prior Art

Pallet racks are often used in warehouses and retail facilities for pallet material storage. Placement of pallets onto and under pallet racks is generally accomplished using a forklift or other material handling equipment such as pallet jacks. Improper and/or inexact placement of materials onto and under pallet racks may, for example, cause damage to walls or injury to personnel who may be standing on the back side of the pallet rack, if a pallet should slide off of the back side of the pallet rack. To address this problem, certain manufacturers developed backstop systems for attachment to pallet racks. These backstop systems generally feature a rear panel which is coupled to the pallet rack using brackets.

Another issue pallet racks face is that they do not provide secure storage of materials positioned thereon. To address this inadequacy, certain manufacturers developed security cage systems for attachment to pallet racks. These security cage systems generally feature a plurality of panels which are coupled to the pallet rack to enclose it. Certain panels of the plurality of panels may be coupled to the pallet rack using hinges while the remainder are rigidly connected using brackets. Similar to backstop systems, security cage systems feature a rear panel which is coupled to the pallet rack using brackets.

Both systems present common problems, generally concerning the difficulty of installing the rear panel and the associated brackets. The brackets of these systems usually include precisely milled bracket holes. Installation of these brackets, whether or not pre-attached to the rear panel, requires both vertical and horizontal alignment of the bracket holes with the leg holes of the pallet rack. When pre-attached, installation can be difficult because it is hard to manipulate the weight of the rear panel while trying to align the holes. Even when not pre-attached, installation can be complicated by ensuring that upper and lower brackets are horizontally aligned between different legs of the pallet rack.

BRIEF DESCRIPTION

It is an object of the present invention to provide a new and improved rear mounting bracket and method of use for attaching a rear panel of a safety backstop system or a security cage system onto a pallet rack. The rear mounting bracket features orientation or alignment tabs which provide optional positions (or lateral adjustment) of the rear panel relative to the pallet rack. The orientation or alignment tabs further provide lateral alignment of slots of the rear mounting bracket with holes of a leg of the pallet rack. The slots of the rear mounting bracket feature a vertical elongation which greatly improves the ease at which vertical adjustment and alignment with holes of the leg of the pallet rack is achieved.

The new system's features optimally configured orientation tabs that afford flexible positions of the rear panel relative to the pallet rack (lateral adjustment). On top of that we have the elongated slots that makes it easier to align with holes of a leg of the pallet rack of various manufacturer's designs (vertical alignment/adjustment).

One aspect in accordance with the embodiments disclosed herein is a rear wall system configured to be coupled to a pallet rack having rear pallet rack legs. The rear wall system may comprise a rear wall and at least one adjustable rear bracket configured to couple the rear wall to the rear pallet rack legs. The rear wall may include a rim. The at least one adjustable rear bracket may include a planar main body, a channel, at least one forward slot, at least one rear slot, a forward pair of tabs and a rear pair of tabs. The planar main body may have a rear edge, top and bottom edges extending from the rear edge, and a front edge opposite the rear edge. The channel may extend from the planar main body and may be at least partially defined by the rear edge. The channel may further be configured to receive a portion of the rim of the rear wall. The at least one forward slot and the at least one rear slot of the at least one adjustable rear bracket may be defined in the planar main body. Each of the at least one forward slot and the at least one rear slot may be elongated parallel to the rear edge. Each of the at least one forward slot or the at least one rear slot may be configured to couple to at least one hole of one of the rear pallet rack legs. The forward pair of tabs and the rear pair of tabs may extend from the planar main body opposite the channel. The forward pair of tabs may be configured to define a spaced away rear position of the rear wall for a safety backstop system. The rear pair of tabs may be configured to define a forward close-in position of the rear wall for a security cage system.

In certain embodiments in accordance with this aspect, the at least one forward slot may be positioned closer to the front edge of the planar main body than to the rear edge of the planar main body. Similarly, the at least one rear slot may be positioned closer to the rear edge of the planar main body than to the front edge of the planar main body.

In certain embodiments in accordance with this aspect, the at least one forward slot may comprise a single forward slot configured to couple to at least two holes of one of the rear pallet rack legs. Similarly, the at least one rear slot may comprise a single rear slot configured to couple to at least two holes of one of the rear pallet rack legs.

In certain embodiments in accordance with this aspect, the planar main body may include a height parallel to the rear edge. Further in accordance with this aspect, each of the single forward slot and the single rear slot may include a slot height parallel to the height of the planar main body. The slot height may be greater than or equal to one-half of the height of the planar main body.

In certain embodiments in accordance with this aspect, the slot height may be greater than or equal to 2 inches In certain embodiments in accordance with this aspect, the forward pair of tabs may be offset towards the rear edge from the at least one forward slot. Similarly, the rear pair of tabs may be offset towards the rear edge from the at least one rear slot.

In certain embodiments in accordance with this aspect, an offset between the forward pair of tabs and a central axis of the at least one forward slot may be about 0.75 inches.

Similarly, an offset between the rear pair of tabs and a central axis of the at least one rear slot may be about 0.75 inches.

In certain embodiments in accordance with this aspect, each of the forward pair of tabs and the rear pair of tabs may be defined by folded portions of each of the top and bottom edges of the planar main body.

In certain embodiments in accordance with this aspect, each of the forward pair of tabs and the rear pair of tabs may extend less than 0.5 inches from the planar main body.

In certain embodiments in accordance with this aspect, the at least one adjustable rear bracket comprises four adjustable brackets. Further in accordance with this aspect, a first pair of the four adjustable brackets may be configured to couple the rear wall to one of the rear pallet rack legs and a second pair of the four adjustable brackets may be configured to couple the rear wall to a different one of the rear pallet rack legs.

In certain embodiments in accordance with this aspect, the channel may be at least partially defined by a first flange and a second flange. The first flange may extend from the rear edge of the planar main body perpendicular to the planar main body. The second flange may extend from a free edge of the first flange and may be positioned parallel to the planar main body.

In certain embodiments in accordance with this aspect, each of the planar main body and the second flange may include an aligned hole configured to receive a fastener for coupling a portion of the rim of the rear wall within the channel.

Another aspect in accordance with the embodiments disclosed herein is a method of using at least one rear mounting bracket to install a rear panel of a safety backstop system or a security cage system onto a pallet rack having rear legs. The method may comprise (a) coupling the at least one rear mounting bracket to the rear panel; (b) engaging one of a first pair of alignment tabs or a second pair of alignment tabs of the at least one rear mounting bracket with a rear leg of the pallet rack to position the at least one rear mounting bracket and the rear panel relative to the rear legs; (c) aligning one of a first slot or a second slot of the at least one rear mounting bracket with at least one hole of the rear leg of the pallet rack, the first slot associated with the first pair of alignment tabs and the second slot associated with the second pair of alignment tabs; and (d) coupling one of the first slot or the second slot of the at least one rear mounting bracket to the at least one hole of the rear leg of the pallet rack.

In certain embodiments in accordance with this aspect, step (a) of the method may further comprise receiving a portion of a rim of the rear panel into a channel of the at least one rear mounting bracket. The channel may be defined at a rear end portion of the at least one rear mounting bracket.

In certain embodiments in accordance with this aspect, step (a) of the method may further comprise clamping the portion of the rim of the rear panel within the channel of the at least one rear mounting bracket using a fastener configured to extend across the channel.

In certain embodiments in accordance with this aspect, step (c) of the method may further comprise aligning one of the first slot or the second slot of the at least one rear mounting bracket with two consecutive holes of the rear leg of the pallet rack.

In certain embodiments in accordance with this aspect, step (d) of the method may further comprise defining a close mounting position by coupling the first slot of the at least one rear mounting bracket to the at least one hole of the rear leg of the pallet rack. The close mounting position may further be associated with the security cage system. In accordance with this aspect, step (d) of the method may further comprise disconnecting the first slot of the at least one rear mounting bracket from the at least one hole of the rear leg of the pallet rack; repeating steps (b) and (c) to engage the second pair of alignment tabs with the rear leg of the pallet rack and align the second slot with the at least one hole of the rear leg of the pallet rack; and defining an offset mounting position by coupling the second slot of the at least one rear mounting bracket to the at least one hole of the rear leg of the pallet rack. The offset mounting position may further be associated with the safety backstop system.

In certain embodiments in accordance with this aspect, step (d) of the method may further comprise defining an offset mounting position by coupling the second slot of the at least one rear mounting bracket to the at least one hole of the rear leg of the pallet rack. The offset mounting position may further be associated with the safety backstop system. In accordance with this aspect, step (d) of the method may further comprise disconnecting the second slot of the at least one rear mounting bracket from the at least one hole of the rear leg of the pallet rack; repeating steps (b) and (c) to engage the first pair of alignment tabs with the rear leg of the pallet rack and align the first slot with the at least one hole of the rear leg of the pallet rack; and defining a close mounting position by coupling the first slot of the at least one rear mounting bracket to the at least one hole of the rear leg of the pallet rack. The close mounting position may further be associated with the security cage system.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
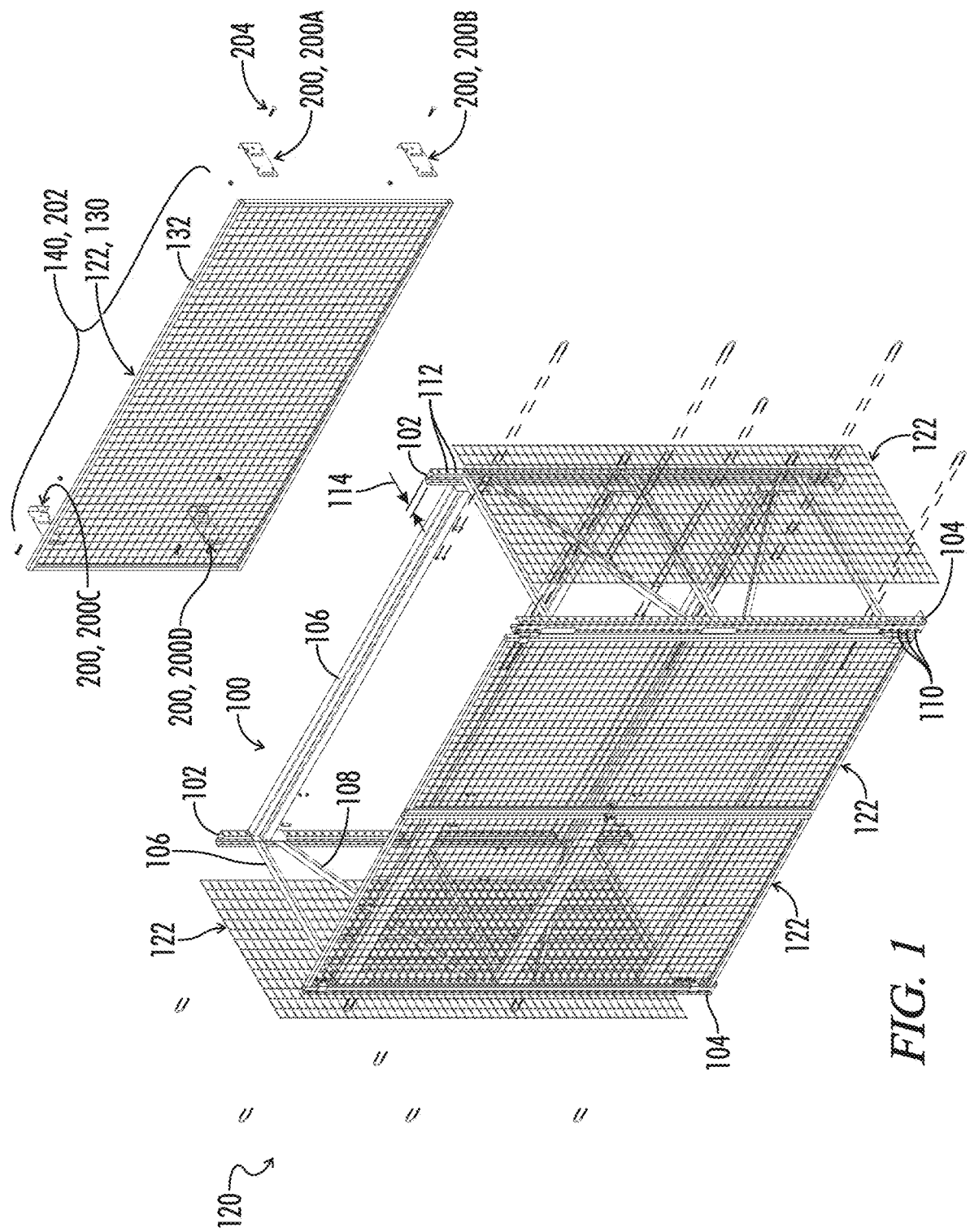
FIG. 1 is front perspective view of a pallet rack with a security cage system exploded therefrom in accordance with the present disclosure.

Referring to FIG. 1, a pallet rack 100 is shown with a security cage system 120 exploded therefrom. The pallet rack 100 may include rear pallet rack legs 102, forward pallet rack legs 104, a plurality of shelf supports 106 spanning between the rear and forward pallet rack legs 102, 104. The rear pallet rack legs 102 may also be referred to herein as rear legs 102. The plurality of shelf supports 106 are configured to support shelves (not shown) of the pallet rack 100. The pallet rack 100 may further include lateral stabilization bracings 108 positioned between the rear pallet rack legs 102 and the forward pallet rack legs 104. The rear pallet rack legs 102 and the forward pallet rack legs 104 may include a plurality of shelf support interface holes 110 defined therethrough and a plurality of holes 112 defined perpendicularly to the plurality of shelf support interface holes 110.

The security cage system 120 is defined by a plurality of panels 122 being coupled (either fixedly or hingedly) to all sides of the pallet rack 100. The plurality of panels 122 may be wire panels, solid panels, or the like. Of particular importance, the security cage system 120 includes a rear panel 130 couplable to the pallet rack 100 using at least one adjustable rear bracket 200. The rear panel 130 may include a rim 132 and may also be referred to herein as a rear wall 130. The at least one adjustable rear bracket 200 may also be referred to herein as at least one rear mounting bracket 200 or at least one adjustable rear mounting bracket 200. The security cage system 120 is configured to create a locked security enclosure on part of or the entire pallet rack 100. The security cage system 120 can be used, for example, to secure valuable items to prevent theft.

The rear panel 130 in combination with the at least one adjustable rear bracket 200 may also define a rear wall system 202 for use in one of a safety backstop system 140 or the security cage system 120. The rear wall system 202 may also be referred to herein as a rear wall kit 202. The rear wall system 202 is configured to be coupled to the rear pallet rack legs 102. The safety backstop system 140 may be configured to prevent items from being placed too far rearwardly on the pallet rack 100 and also to prevent items from falling off the back of the pallet rack 100. The rear panel 130 may be positioned closer to the pallet rack 100 when used as part of the security cage system 120 using the at least one adjustable rear bracket 200 and may be positioned further from the pallet rack 100 when used as part of the safety backstop system 140 using the at least one adjustable rear bracket 200.

Figure 2:
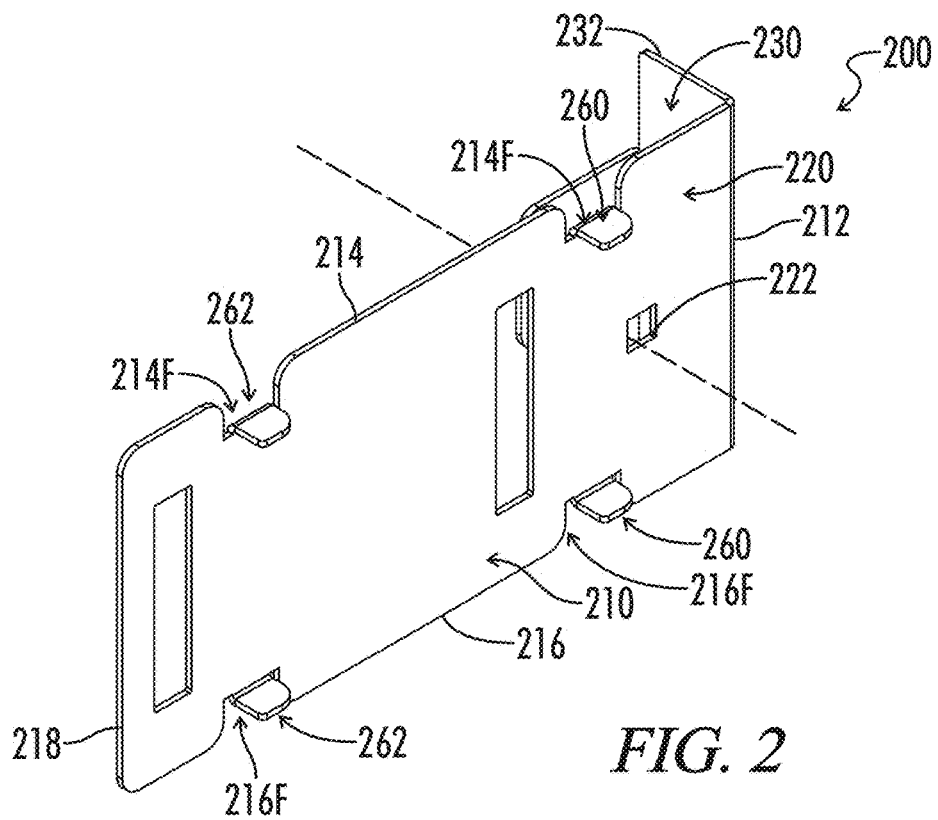
FIG. 2 is a front right top perspective view of an adjustable rear mounting bracket of the security cage system of FIG. 1 or a safety backstop system in accordance with the present disclosure.
Figure 3:
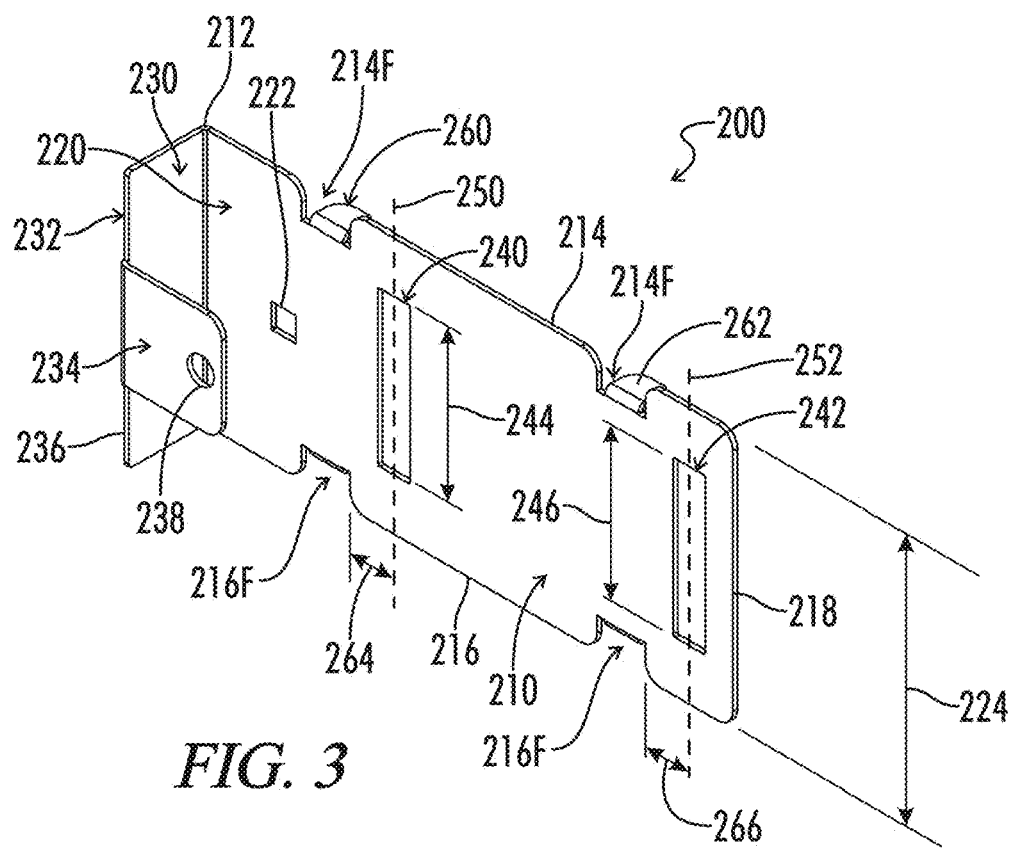
FIG. 3 is a front left top perspective view of the adjustable rear mounting bracket of FIG. 1 in accordance with the present disclosure.

Referring to FIGS. 2 and 3, the at least one adjustable rear bracket 200 is configured to couple the rear panel 130 to the rear pallet rack legs 102 of the pallet rack 100. The at least one adjustable rear bracket 200 may include a planar main body 210, a channel 230, at least one rear slot 240, at least one forward slot 242, a rear pair of tabs 260, and a forward pair of tabs 262. The rear pair of tabs 260 may also be referred to herein as a first pair of alignment tabs 260. The forward pair of tabs 262 may also be referred to as a second pair of alignment tabs 262.

The planar main body 210 may include a rear edge 212, top and bottom edges 214, 216 extending from the rear edge 212, and a front edge 218 opposite the rear edge 212. The planar main body 210 may also include a rear end portion 220 proximate the rear edge 212.

The channel 230 may extend from the planar main body 210 and may be at least partially defined by the rear edge 212. Accordingly, the channel 230 may be defined at the rear end portion 220. The channel 230 may be configured to receive a portion of the rim 132 of the rear panel 130. The channel 230 may at least partially be defined by a first flange 232 and a second flange 234. The first flange 232 may extend from the rear edge 212 of the planar main body 210 perpendicular to the planar main body 210. The second flange 234 may extend from a free edge 236 of the first flange 232 and may further be positioned parallel to the planar main body 210. Each of the planar main body 210 and the second flange 234 may include an aligned hole 222, 238, respectively, configured to receive a fastener 204 (shown in FIG. 1) for coupling a portion of the rim 132 of the rear panel 130 within the channel 230. The portion of the rim 132 may, for example, be clamped within the channel 230.

The at least one rear slot 240 and the at least one forward slot 242 may be defined in the planar main body 210. Each of the at least one rear slot 240 and the at least one forward slot 242 may be elongated parallel to the rear edge 212 of the planar main body 210 to allow more adjustability for bolt placement. Each of the at least one rear slot 240 or the at least one forward slot 242 may be configured to couple to at least one hole of the plurality of holes 112 of one of the rear pallet rack legs 102.

Figure 4:
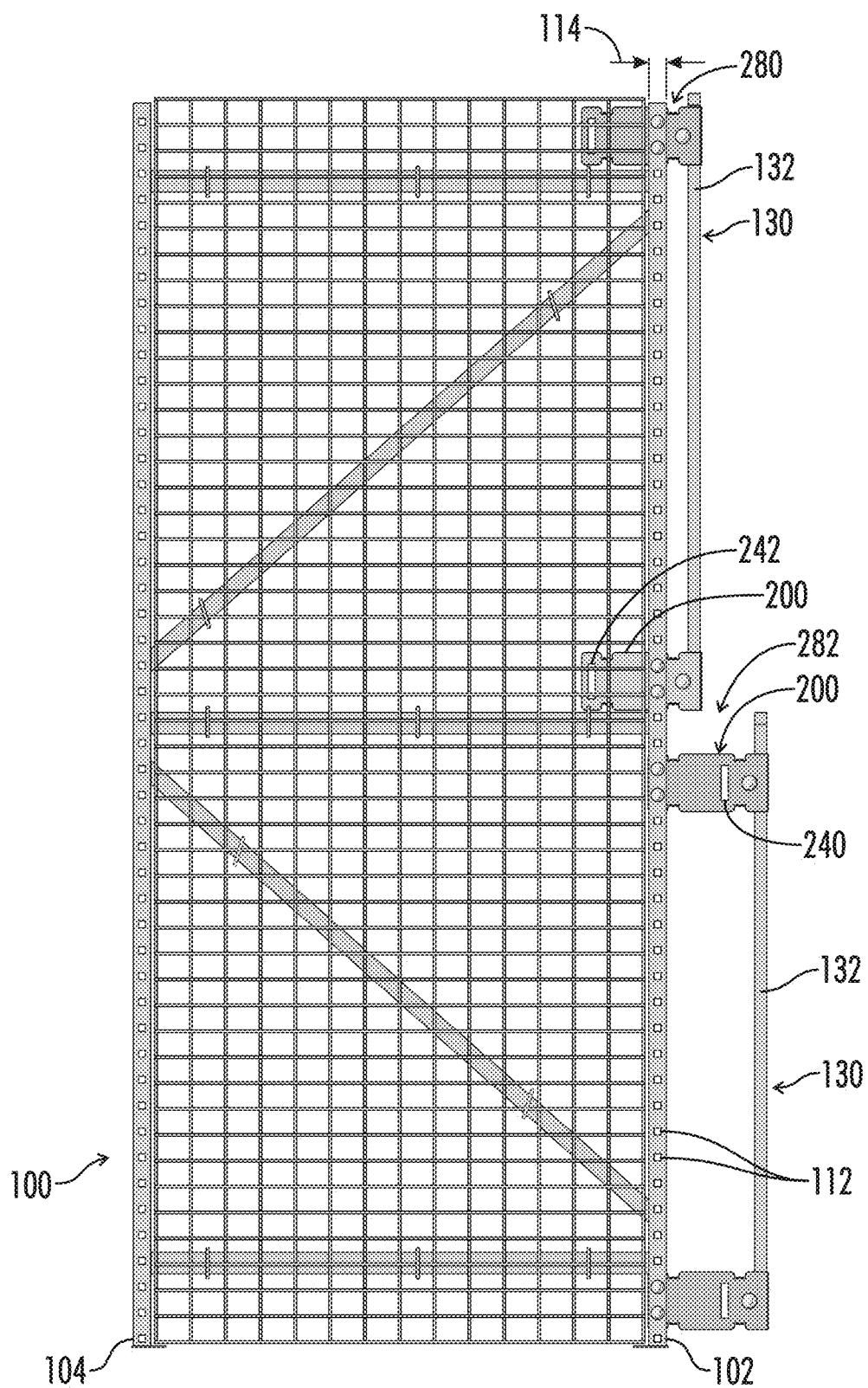
FIG. 4 is a right side elevation view of multiple adjustable rear mounting brackets of FIG. 1 installed onto the pallet rack in an offset mounting position associated with the safety backstop system as well as a close mounting position associated with the security cage system in accordance with the present disclosure.

The rear pair of tabs 260 and the forward pair of tabs 262 may extend perpendicularly from the planar main body 210 opposite the channel 230. The rear pair of tabs 260 may be configured to define a close mounting position 280 (shown in FIG. 4) of the rear panel 130 relative to the pallet rack 100 associated with the security cage system 120. The close mounting positioned 280 may also be referred to as a forward close-in position 280. The forward pair of tabs 262 may be configured to define an offset mounting position 282 (shown in FIG. 4) of the rear panel 130 relative to the pallet rack 100 associated with the safety backstop system 140. The offset mounting position 282 may also be referred to herein as a spaced away rear position 282.

The rear pair of tabs 260 may be configured to engage one of the rear pallet rack legs 102 for laterally aligning the at least one rear slot 240 with at least one hole of the plurality of holes 112 of one of the rear pallet rack legs 102. Alternately, the forward pair of tabs 262 may be configured to engage of the rear pallet rack legs 102 for laterally aligning the at least one forward slot 242 with at least one hole of the plurality of holes 112 of one of the rear pallet rack legs 102.

The at least one rear slot 240 may be positioned closer to the rear edge 212 of the planar main body 210 than to the front edge 218 of the planar main body 210. The at least one forward slot 242 may be positioned closer to the front edge 218 of the planar main body 210 than to the rear edge 212 of the planar main body 210.

As illustrated, the at least one rear slot 240 may comprise a single rear slot. The at least one rear slot 240 may also be referred to herein as a first slot 240 or a rear slot 240. The at least one forward slot 242 may comprise a single forward slot. The at least one forward slot 242 may also be referred to herein as a second slot 242 or a forward slot 242. In certain optional embodiments, each of the at least one rear slot 240 and/or the at least one forward slot 242 may comprise multiple elongated slots vertically aligned and positioned parallel to the rear edge 212 of the planar main body 210.

The planar main body 210 may include a height 224 parallel to the rear edge 212 and defined between the top edge 214 and the bottom edge 216. Each of the single rear slot (i.e., the at least one rear slot 240) and the single forward slot (i.e., the at least one forward slot 242) may include a slot height 244, 246, respectively, parallel to the height 224 of the planar main body 210. The slot height 244 of the single rear slot and the slot height 246 of the single forward slot may be greater than a majority (e.g., greater than 50%) of the height 224 of the planar main body 210. More particularly, the slot heights 244, 246 may be greater than or equal to 2 inches. The slot heights 244, 246 may generally be elongated enough to align with two consecutive holes of the plurality of holes 112 of one of the rear pallet rack legs 102 of the pallet rack 100. This elongation enables easy vertical adjustment of the slot to align with any two consecutive holes.

The rear pair of tabs 260 may be offset towards the rear edge 212 of the planar main body 210 from the at least one rear slot 240. Similarly, the forward pair of tabs 262 may be offset toward the rear edge 212 of the planar main body 210 from the at least one forward slot 242. An offset 264 between the rear pair of tabs 260 and a central axis 250 of the at least one rear slot 240 may be about half of a depth 114 (shown in FIG. 1) of the rear pallet rack legs 102. In certain optional embodiments, the offset 264 may be about 0.75 inches. An offset 266 between the forward pair of tabs 262 and a central axis 252 of the at least one forward slot 242 may be about half of the depth 114 of the rear pallet rack legs 102. In certain optional embodiments, the offset 266 may be about 0.75 inches.

In certain optional embodiments, each of the rear pair of tabs 260 and the forward pair of tabs 262 may be defined by folded portions 214F, 216F of each of the top edge 214 and the bottom edge 216 of the planar main body 210, respectively. Accordingly, each of the rear pair of tabs 260 and the forward pair of tabs 262 may be integrally formed with the planar main body 210. In other optional embodiments (not shown), the rear pair of tabs 260 and the forward pair of tabs 262 may be separate from and coupled to the planar main body 210. Each of the rear pair of tabs 260 and the forward pair of tabs 262 may extend less than about 0.5 inches from the planar main body 210. In other optional embodiments, each of the rear pair of tabs 260 and the forward pair of tabs 262 may extend more than about 0.5 inches from the planar main body 210.

As illustrated in FIG. 1, the at least one adjustable rear bracket 200 of the rear wall system 202 may comprise four adjustable rear brackets 200A, 200B, 200C, 200D. A first pair, namely 200A and 200B, of the four adjustable rear brackets may be configured to couple the rear panel 130 to one of the rear pallet rack legs 102. A second pair, namely, 200C and 200D, of the four adjustable rear brackets may be configured to couple the rear panel 130 to a different one of the rear pallet rack legs 102.

Figure 5:
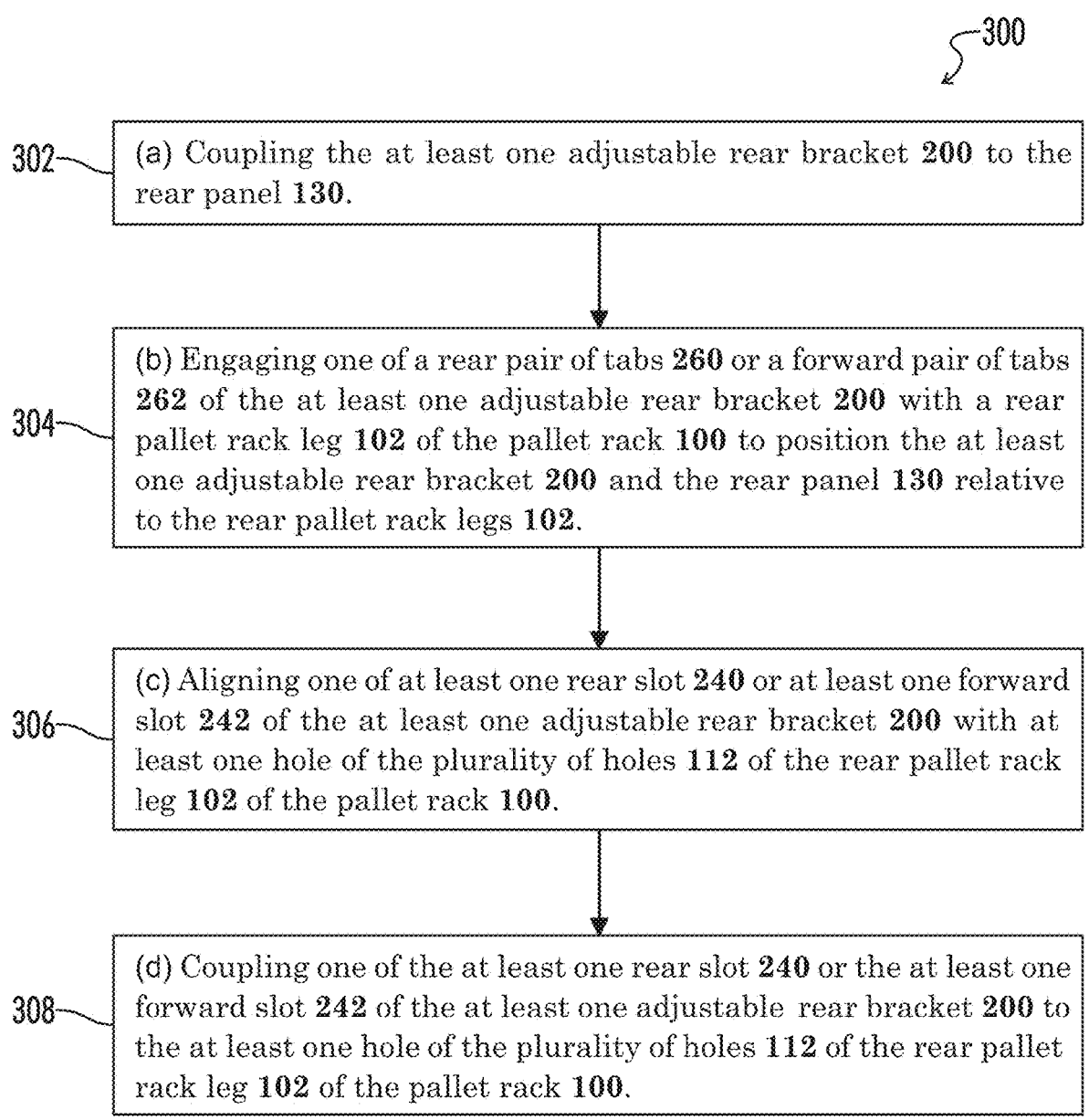
FIG. 5 is a flowchart of a method of using the at least one rear mounting bracket to install a rear panel of a safety backstop system or a security cage system onto a pallet rack in accordance with the present disclosure.

Referring to FIG. 5, a flowchart of a method 300 of using at least one adjustable rear bracket 200 to install a rear panel 130 of a safety backstop system 140 or a security cage system 120 onto a pallet rack 100 having rear pallet rack legs 102 is shown. The method 300 may include step (a) coupling 302 the at least one adjustable rear bracket 200 to the rear panel 130. The method 300 may further include step (b) engaging 304 one of a rear pair of tabs 260 or a forward pair of tabs 262 of the at least one adjustable rear bracket 200 with a rear pallet rack leg 102 of the pallet rack 100 to position the at least one adjustable rear bracket 200 and the rear panel 130 relative to the rear pallet rack legs 102. The method 300 may further include step (c) aligning 306 one of at least one rear slot 240 or at least one forward slot 242 of the at least one adjustable rear bracket 200 with at least one hole of the plurality of holes 112 of the rear pallet rack leg 102 of the pallet rack 100. As previously mentioned, the at least one rear slot 240 may be associated with the rear pair of tabs 260 and the at least one forward slot 242 may be associated with the forward pair of tabs 262. The method 300 may further include step (d) coupling 308 one of the at least one rear slot 240 or the at least one forward slot 242 of the at least one adjustable rear bracket 200 to the at least one hole of the plurality of holes 112 of the rear pallet rack leg 102 of the pallet rack 100.

In certain optional embodiments, step (a) of the method 300 may further include receiving a portion of a rim 132 of the rear panel 130 into a channel 230 of the at least one adjustable rear bracket 200. The channel 230 may be defined at a rear end portion 220 of the at least one adjustable rear bracket 200. Step (a) of the method 300 may further include clamping the portion of the rim 132 of the rear panel 130 within the channel 230 of the at least one adjustable rear bracket 200 using a fastener 204 configured to extend across the channel 230.

In further optional embodiments, step (c) of the method 300 may further include aligning one of the at least one rear slot 240 or the at least one forward slot 242 of the at least one adjustable rear bracket 200 with two consecutive holes of the plurality of holes 112 of the rear pallet rack leg 102 of the pallet rack 100.

In certain optional embodiments, step (d) of the method 300 may further include defining a close mounting position 280 by coupling the at least one rear slot 240 of the at least one adjustable rear bracket 200 to the at least one hole of the plurality of holes 112 of the rear pallet rack leg 102 of the pallet rack 100. The close mounting position 280 may further be associated with the security cage system 120.

Optionally, step (d) of the method 300 may further include disconnecting the at least one rear slot 240 of the at least one adjustable rear bracket 200 from the at least one hole of the plurality of holes 112 of the rear pallet rack leg 102 of the pallet rack 100; repeating steps (b) and (c) to engage the forward pair of tabs 262 with the rear pallet rack leg 102 of the pallet rack 100 and align the at least one forward slot 242 with the at least one hole of the plurality of holes 112 of the rear pallet rack leg 102 of the pallet rack 100; and defining an offset mounting position 282 by coupling the at least one forward slot 242 of the at least one adjustable rear bracket 200 to the at least one hole of the plurality of holes 112 of the rear pallet rack leg 102 of the pallet rack 100. The offset mounting position 282 may further be associated with the safety backstop system 140.

In further optional embodiments, step (d) of the method 300 may further include defining an offset mounting position 282 by coupling the at least one forward slot 242 of the at least one adjustable rear bracket 200 to the at least one hole of the plurality of holes 112 of the rear pallet rack leg 102 of the pallet rack 100. The offset mounting position 282 may further be associated with the safety backstop system 140

Optionally, step (d) of the method 300 may further include disconnecting the at least one forward slot 242 of the at least one adjustable rear bracket 200 from the at least one hole of the plurality of holes 112 of the rear pallet rack leg 102 of the pallet rack 100; repeating steps (b) and (c) to engage the rear pair of tabs 260 with the rear pallet rack leg 102 of the pallet rack 100 and align the at least one rear slot 240 with the at least one hole of the plurality of holes 112 of the rear pallet rack leg 102 of the pallet rack 100; and defining a close mounting position 280 by coupling the at least one rear slot 240 of the at least one adjustable rear bracket 200 to the at least one hole of the plurality of holes 112 of the rear pallet rack leg 102 of the pallet rack 100. The close mounting position 280 may further be associated with the security cage system 120.

An advantage of the at least one adjustable rear bracket 200 includes its adjustability for mounting the rear panel 130 at two different distances from the pallet rack 100 (e.g., the close mounting position 280 and the offset mounting position 282). Another advantage of the at least one adjustable rear bracket 200 is its ability to be mounted at any location along the rim 132 of the rear panel 130. Additionally, the at least one adjustable rear bracket 200 can function as both a right bracket and a left bracket. Another advantage of the at least one adjustable rear bracket 200 is that it allows the rear panel 130 to be set in place and held prior to the bolts being installed for ease of installation. A further advantage of the at least one adjustable rear bracket 200 is its ability to be mounted at any height along each of the rear pallet rack legs 102 having holes 112. One of the rear pair of tabs 260 or the forward pair of tabs 262, depending on the mounting position (e.g., the close mounting position 280 and the offset mounting position 282) advantageously keeps the at least one adjustable rear bracket 200 from sagging (e.g., the at least one adjustable rear bracket extends and maintains a perpendicular orientation from the rear pallet rack legs 102). The channel 230 of the at least one adjustable rear bracket 200 advantageously allows the rim 132 of the rear panel 130 to be positioned within the channel 230 and clamped down using the fastener 204. This further increases the vertical adjustability of the rear panel 130 relative to the at least one adjustable rear bracket 200 due to the fastener 204 not having to pass through a predefined hole (non-existent) of the rim 132 of the rear panel 130.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A rear wall system configured to be coupled to a pallet rack having rear pallet rack legs, the rear wall system comprising:
   a rear wall having a rim; and
   at least one adjustable rear bracket configured to couple the rear wall to the rear pallet rack legs, the at least one adjustable rear bracket including:
      a planar main body having a rear edge, top and bottom edges extending from the rear edge, and a front edge opposite the rear edge;
      a channel extending from the planar main body and at least partially defined by the rear edge, the channel configured to receive a portion of the rim of the rear wall;
      at least one forward slot and at least one rear slot defined in the planar main body, each of the at least one forward slot and the at least one rear slot elongated parallel to the rear edge, each of the at least one forward slot or the at least one rear slot configured to couple to at least one hole of one of the rear pallet rack legs; and
      a forward pair of tabs and a rear pair of tabs extending from the planar main body opposite the channel, the forward pair of tabs configured to define a spaced away rear position of the rear wall for a safety backstop system, the rear pair of tabs configured to define a forward close-in position of the rear wall for a security cage system.

2. The rear wall system of claim 1, wherein:
   the at least one forward slot is positioned closer to the front edge of the planar main body than to the rear edge of the planar main body; and
   the at least one rear slot is positioned closer to the rear edge of the planar main body than to the front edge of the planar main body.

3. The rear wall system of claim 1, wherein:
   the at least one forward slot comprises a single forward slot configured to couple to at least two holes of one of the rear pallet rack legs; and
   the at least one rear slot comprises a single rear slot configured to couple to at least two holes of one of the rear pallet rack legs.

4. The rear wall system of claim 3, wherein:
   the planar main body includes a height parallel to the rear edge; and
   each of the single forward slot and the single rear slot include a slot height parallel to the height of the planar main body, the slot height being greater than or equal to one-half of the height of the planar main body.

5. The rear wall system of claim 4, wherein:
   the slot height is greater than or equal to 2 inches.

6. The rear wall system of claim 1, wherein:
   the forward pair of tabs are offset towards the rear edge from the at least one forward slot; and
   the rear pair of tabs are offset towards the rear edge from the at least one rear slot.

7. The rear wall system of claim 6, wherein:
   an offset between the forward pair of tabs and a central axis of the at least one forward slot is about 0.75 inches; and
   an offset between the rear pair of tabs and a central axis of the at least one rear slot is about 0.75 inches.

8. The rear wall system of claim 1, wherein:
   each of the forward pair of tabs and the rear pair of tabs are defined by folded portions of each of the top and bottom edges of the planar main body.

9. The rear wall system of claim 1, wherein:
   each of the forward pair of tabs and the rear pair of tabs extends less than 0.5 inches from the planar main body.

10. The rear wall system of claim 1, wherein:
the at least one adjustable rear bracket comprises four adjustable brackets;
a first pair of the four adjustable brackets are configured to couple the rear wall to one of the rear pallet rack legs; and
a second pair of the four adjustable brackets are configured to couple the rear wall to a different one of the rear pallet rack legs.

11. The rear wall system of claim 1, wherein:
the channel is at least partially defined by a first flange and a second flange, the first flange extending from the rear edge of the planar main body perpendicular to the planar main body, the second flange extending from a free edge of the first flange and positioned parallel to the planar main body.

12. The rear wall system of claim 11, wherein:
each of the planar main body and the second flange include an aligned hole configured to receive a fastener for coupling a portion of the rim of the rear wall within the channel.

13. A method of using at least one rear mounting bracket to install a rear panel of a safety backstop system or a security cage system onto a pallet rack having rear legs, the method comprising:
(a) coupling the at least one rear mounting bracket to the rear panel;
(b) engaging one of a first pair of alignment tabs or a second pair of alignment tabs of the at least one rear mounting bracket with a rear leg of the pallet rack to position the at least one rear mounting bracket and the rear panel relative to the rear legs;
(c) aligning one of a first slot or a second slot of the at least one rear mounting bracket with at least one hole of the rear leg of the pallet rack, the first slot associated with the first pair of alignment tabs and the second slot associated with the second pair of alignment tabs; and
(d) coupling one of the first slot or the second slot of the at least one rear mounting bracket to the at least one hole of the rear leg of the pallet rack.

14. The method of claim 13, wherein step (a) further comprises:
receiving a portion of a rim of the rear panel into a channel of the at least one rear mounting bracket, the channel defined at a rear end portion of the at least one rear mounting bracket.

15. The method of claim 14, wherein step (a) further comprises:
clamping the portion of the rim of the rear panel within the channel of the at least one rear mounting bracket using a fastener configured to extend across the channel.

16. The method of claim 13, wherein step (c) further comprises:
aligning one of the first slot or the second slot of the at least one rear mounting bracket with two consecutive holes of the rear leg of the pallet rack.

17. The method of claim 13, wherein step (d) further comprises:
defining a close mounting position by coupling the first slot of the at least one rear mounting bracket to the at least one hole of the rear leg of the pallet rack, the close mounting position further associated with the security cage system.

18. The method of claim 17, wherein step (d) further comprises:
disconnecting the first slot of the at least one rear mounting bracket from the at least one hole of the rear leg of the pallet rack;
repeating steps (b) and (c) to engage the second pair of alignment tabs with the rear leg of the pallet rack and align the second slot with the at least one hole of the rear leg of the pallet rack; and
defining an offset mounting position by coupling the second slot of the at least one rear mounting bracket to the at least one hole of the rear leg of the pallet rack, the offset mounting position further associated with the safety backstop system.

19. The method of claim 13, wherein step (d) further comprises:
defining an offset mounting position by coupling the second slot of the at least one rear mounting bracket to the at least one hole of the rear leg of the pallet rack, the offset mounting position further associated with the safety backstop system.

20. The method of claim 19, wherein step (d) further comprises:
disconnecting the second slot of the at least one rear mounting bracket from the at least one hole of the rear leg of the pallet rack;
repeating steps (b) and (c) to engage the first pair of alignment tabs with the rear leg of the pallet rack and align the first slot with the at least one hole of the rear leg of the pallet rack; and
defining a close mounting position by coupling the first slot of the at least one rear mounting bracket to the at least one hole of the rear leg of the pallet rack, the close mounting position further associated with the security cage system.

* * * * *